United States Patent [19]

Thwaites

[11] 4,202,253
[45] May 13, 1980

[54] STRUCTURAL CELLULAR MATERIALS

[75] Inventor: Peter John Thwaites, Eltisley, England

[73] Assignee: Dufaylite Developments Limited, England

[21] Appl. No.: 966,240

[22] Filed: Dec. 4, 1978

[30] Foreign Application Priority Data

Dec. 8, 1977 [GB] United Kingdom ............... 51070/77

[51] Int. Cl.$^2$ ............................................. B31D 3/02
[52] U.S. Cl. ..................................... 93/1 H; 156/197
[58] Field of Search ....................... 156/196, 197, 198; 93/1 H, 60, 84 R, 1 R

[56] References Cited

U.S. PATENT DOCUMENTS

| 2,719,807 | 10/1955 | Steele | 93/1 H |
| 3,514,352 | 5/1970 | Judge, Jr. | 156/197 |
| 3,996,087 | 12/1976 | May et al. | 156/197 |

*Primary Examiner*—James F. Coan
*Attorney, Agent, or Firm*—William A. Drucker

[57] ABSTRACT

Structural honeycomb material is expanded to the open, hexagonally cellular state, by pulling it out in the expansion direction. It is then compressed across the expansion direction and fed through a throat where it undergoes further compression which creases the constituent material. On being allowed to re-expand, the material adopts a stable open-cellular state. The feeding of the material through the throat is accomplished by driving means which engages the material across the expansion direction. This is an improvement on feeding it between driving rollers having rotational axes parallel with the major axes of the cells. Satisfactory compression in the throat is more easily obtained, especially with small cell-sizes.

16 Claims, 4 Drawing Figures

STRUCTURAL CELLULAR MATERIALS

The present invention relates to structural honeycomb materials of the kind described in our British Specification No. 591,772. Materials of this kind when pulled-out in the expansion direction adopt an open-cellular state in which the individual cells are generally hexagonal. This expansion direction is generally perpendicular to the planes of the strips of paper or other material of which the honeycomb material is formed. It is almost universal to form the honeycomb material to be produced in the unexpanded state from paper or other material in the flat condition so that the cells are initially closed. Techniques are known for producing honeycomb material directly in the open-cellular state, though such techniques are not widely practised. Honeycomb material has a recognisable expansion direction perpendicular to the main dimensions of the constituent continuous strips. Even though these strips have an angularly corrugated configuration the direction of their main dimensions is readily recognised.

Reference will be made hereinafter to a direction across the expansion direction of the honeycomb material. Such direction is the direction in which the strips run in normally expanded or unexpanded honeycomb material and is not to be confused with the direction of the major axes of the cells which is perpendicular to both the directions referred to hereinbefore.

Structural honeycomb materials produced by expansion are usually unstable in the open cellular state, in the absence of special treatment tending to revert to the unexpanded state. The resulting dimensional instability can cause problems in handling pieces of expanded material intended as a core for doors and other panels of sandwich construction.

In our British Specification No. 1,355,642 we have shown that an unexpanded structural honeycomb material formed of paper or other permanently creasable material can be converted to a self-sustaining open cellular state by extending the honeycomb material in its expansion direction so that the cells adopt a configuration in which the cells have dimensions in the expansion direction which are large compared with their dimensions in the direction of the compression and the permanently creasable material is creased. When the compression is relaxed the honeycomb material contracts in the expansion direction and re-expands across the expansion direction to adopt a new stable open-cellular state. Objects of the present invention are to improve upon this method of conversion, and to provide improved apparatus therefor.

In accordance with the present invention, there is provided apparatus for treating a structural honeycomb material formed of permanently creasable material which comprises a support for supporting the material in the expanded, generally hexagonally cellular, state and permitting movement thereof in the expansion direction, guide means arranged and configured to engage the edges of the material as it is moved in the expansion direction and, by reaction with said edges, compress the material across the expansion direction into an intermediately compressed state, a throat for receiving the material in said state and further compressing it, by reaction therewith, to produce permanent creases in the creasable material so that the honeycomb material is converted to the condition in which, given freedom to expand, it re-expands across the expansion direction to an open cellular state across the width thereof taken across the expansion direction and thereby draw out the material along the support between said guide means and feed it through said throat for the further compression thereby.

Further in accordance with the present invention there is provided a method for treating a structural honeycomb material formed of permanently creasable material to convert it to a stably re-expandable material, which comprises drawing the material along a support whilst compressing it across the expansion direction to an intermediately compressed state by engagement of its edges with guide means arranged to produce said compression, and further compressing the material to produce permanent creases in the permanently creasable material by passing the intermediately compressed material through a throat, the drawing of the material along the support and passage thereof to the throat being effected by driving means engaging the material in said intermediately compressed state across the width thereof taken in the expansion direction.

Our British Specification No. 1,355,642 describes the use of a pair of rollers for engaging the honeycomb material and thereby extending it and compressing it across the expansion direction. These rollers have their axes parallel with the major axes of the cells and they bear upon the sides of the material. Good results have been obtained in commercial practice using apparatus installed at the point of use of the honeycomb material in sandwich structures, but care is necessary to obtain and maintain an adequately satisfactory compression throughout the material for the avoidance of major faults. With the present method and apparatus, having the driving means engaging the material in the intermediately compressed state and across the width thereof as aforesaid, and feeding it through a throat for the further compression, enable a satisfactory compression to be obtained and maintained more easily.

With the method of British Specification No. 1,355,642 the treatment of material of small cell size is especially difficult, and the width of the material measured across the original expansion direction has had to be restricted accordingly in industrial practice. For example, the practical maximum width is from 500 to 600 mm for a cell size giving 30 cells per meter of width and is less for smaller cell sizes. The present method is especially advantageous when applied to material giving 30 or more cells per meter of width. With material giving 30 cells per meter of width, the width of material treated may be increased to 1 meter at least, if desired by treating two or more narrow materials together. Material giving 45 cells per meter of width is readily treated by the present method. Damage to the cellular structure, e.g. the tearing at the glue lines, often encountered with the prior method, tends to be avoided. References herein to the width dimension of the material are to be taken as referring to the width dimension of the material in its original unexpanded state. The number of cells per meter is to be taken as a measure of a complete cell rather than being derived from a count of cells across the whole width of the material, i.e. it is unaffected by edge effects. In evaluating the number of cells per meter, all of the cells bounded by a constituent strip are included. Such cells alternate from side to side of the strip. The number would be twice the number of adhesive bands at one face of the strip for material of infinite width.

Most conveniently, the throat is arranged downstream of the driving means. It is however within the entrance of the throat. As the driving means, there may be employed at least one driven roller, the rotary axis of which lies across the expansion direction. In a preferred arrangement, which avoids a non-moving support for the material subjected to the action of a single roller, two rollers are preferably employed. In its most preferred form, the driving means is a pair of rollers each of which is faced with a resilient material, and has its rotary axis lying across the expansion direction, said rollers cooperating to form a nip for the engagement of the material.

Forms of driving means other than rollers are possible, e.g. belts with laps running in the expansion direction and bearing upon the material may be employed but rollers are simple in themselves, simple to install, and eminently satisfactory in practice.

The throat is preferably adjustable in its width across the expansion direction. It may take the form of a pair of fences extending generally in the expansion direction and advantageously adjustable in their configuration. Adjustability is advantageous in setting up the apparatus, frequently being required when the grade of the honeycomb material to be processed is changed. Supplies of honeycomb material can differ in the nature of the constituent sheet material, the cell size, the width of the adhesive bands and the thickness dimension, i.e. the width dimension of the constituent strips which is equal to the length of the major axes of the cells.

The throat may be provided in the form of rollers, preferably a row of rollers for each side of the material, but fences are preferred, being more economic in construction than roller arrangements and providing continuous surfaces for the further compression.

For best results, a plate or other weighting device is provided for bearing upon the material as it moves through the guide means.

Structural honeycomb material produced from flat sheet material is virtually always distributed and stored in the unexpanded state, and expanded to the open cellular state at the point of use. By providing a cutting device arranged to cut the material across the (original) expansion direction after its further compression, the expanded material may be produced in lengths suitable for the intended application. For convenience in handling the processed material, the throat and the cutting device may be followed in the (original) expansion direction by a platform for receiving and supporting the material from the throat and permitting it to expand to the stable open cellular state. The driving means and the cutting means may be arranged to act intermittently, synchronised to provide material in required lengths, and their action initiated by operating a simple manual control, or initiated automatically on removal of a cut length from the platform, or on receipt of a signal from other machinery, e.g. a demand signal from a laminating machine.

To avoid waste, the unexpanded honeycomb material is commonly supplied in a continuous form, e.g. lapped in a forklift stillage. Its expansion properties are conducive to lapping. For use with honeycomb material supplied in continuous unexpanded form, the apparatus may be provided with one or more guide rollers for guiding the material on to the support.

It will be understood that the apparatus of the invention does not need to be fed with honeycomb material in the expanded, generally hexagonally cellular state. When the apparatus is fed with unexpanded honeycomb, the pull of the driving means operates to pull out the honeycomb into this state before it encounters the guide means which compresses it across the expansion direction.

The following description in which reference is made to the accompanying drawings is given in order to illustrate the invention, In the drawings.

Figure 1:
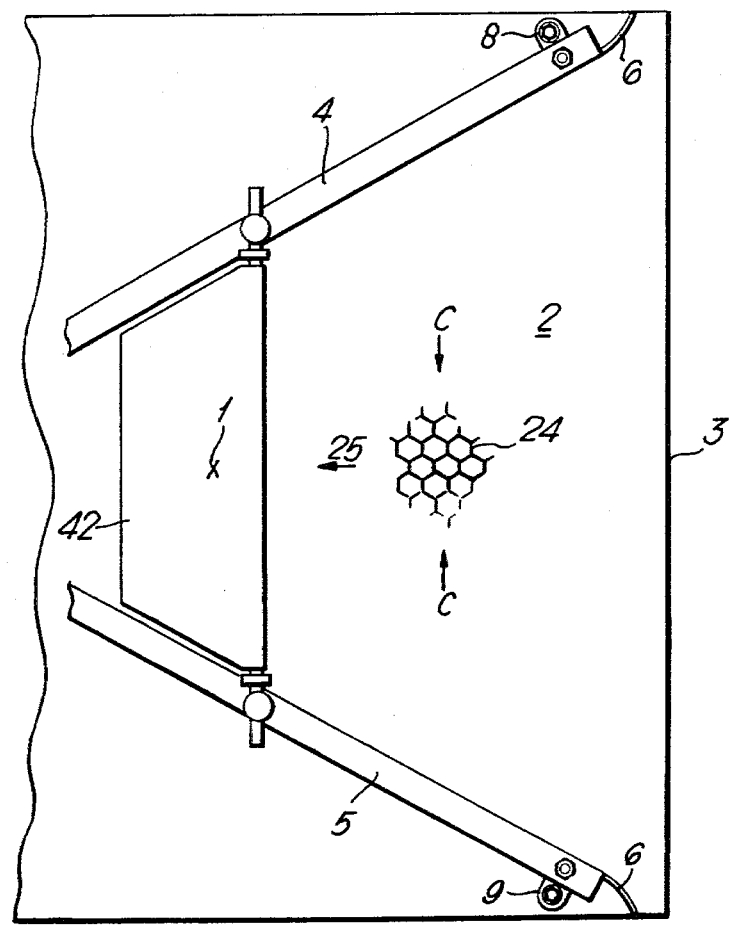
FIG. 1 is a plan showing part of an apparatus, according to the invention.
Figure 2:
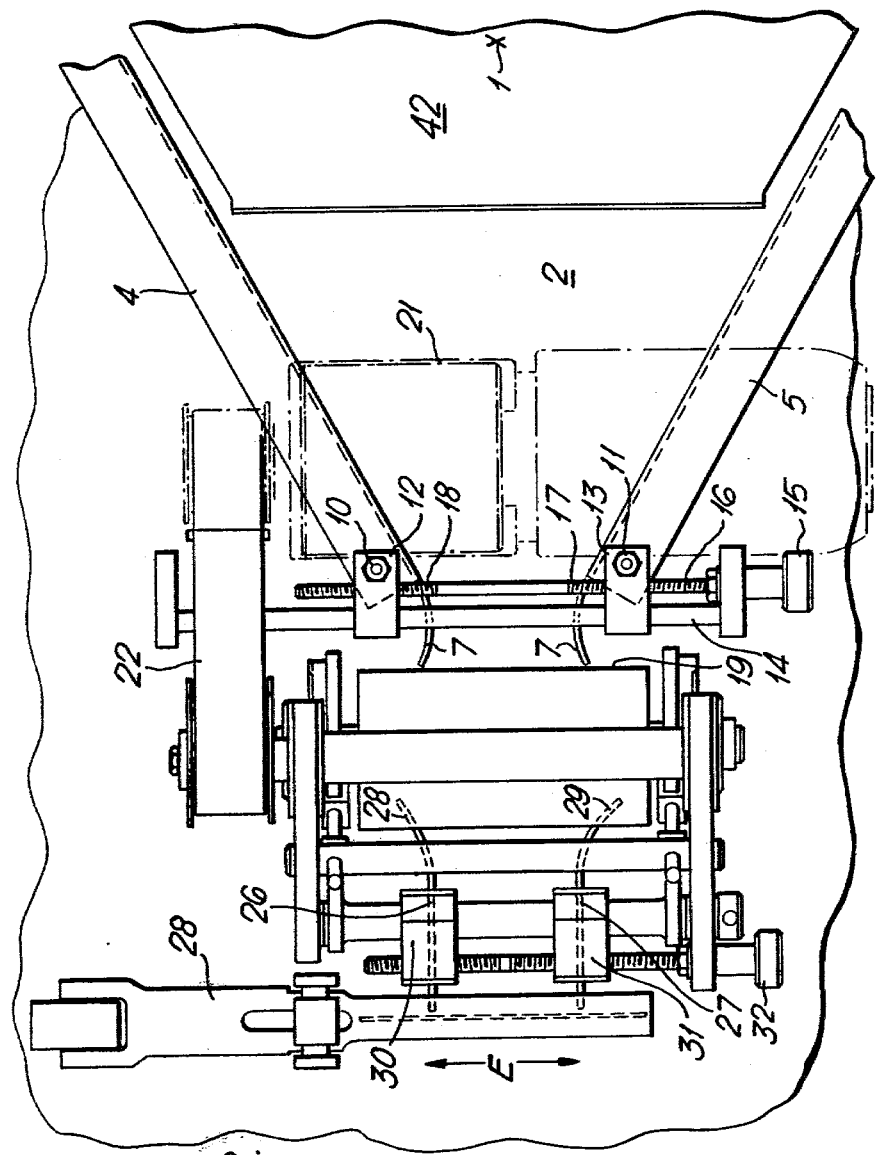
FIG. 2 is a plan on a larger scale showing the remainder of the apparatus.

Point 1, shown in FIGS. 1 & 2, is at the same position in both cases. It is given to indicate how FIGS. 1 and 2 are related and has no other significance.

In the apparatus shown a table 2, for receiving continuous unexpanded honeycomb over its end 3 is fitted with a pair of guide members 4 & 5 formed of channel section metal. These members converge as shown. At their ends they are cut and curved to form curved divergent terminal lips 6 & 7 to facilitate smooth operation. Members 4 & 5 are pivotally secured to slides 12 & 13 movable along a transverse rod 14 by an adjustment knob 15 secured to a bar 16 having oppositely screw-threaded portions 17 & 18 engaged with the slides.

Figure 3:
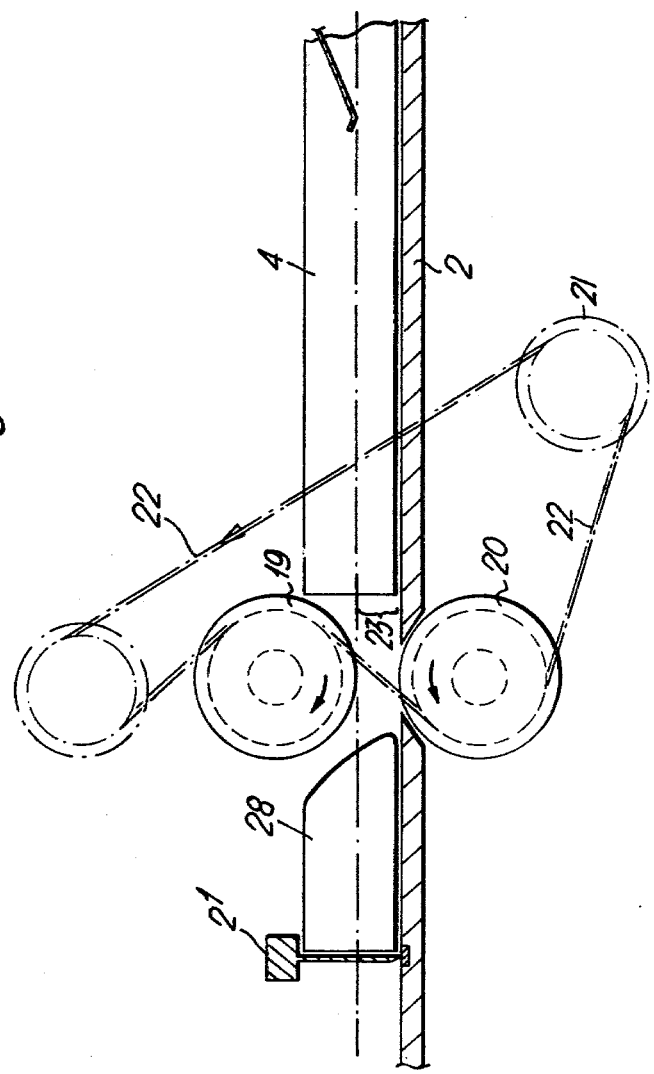
FIG. 3 is a diagrammatic elevation showing parts of the apparatus.

A pair of transverse rubber faced rollers 19 & 20, driven in the opposite directions indicated in FIG. 3 by a motor 21 and belt-system 22, operates to draw the honeycomb 23 from end 3 of the table. In the drawing operation, the honeycomb 23 is pulled out in its normal expansion direction and first opens to the normal expanded state wherein it has a hexagonal cellular structure indicated diagrammatically at 24 in FIG. 1. The normal expansion direction is indicated by arrow 25. As it continues to be drawn by the rollers, the honeycomb is compressed across the normal expansion direction by engagement with members 4 & 5. The directions of the compression forces are indicated by arrows C. A pivoted plate 42 holds the honeycomb down during its travel along table 2.

When the material reaches rollers 19 & 20 the cells thereof are closed, almost completely, across the normal expansion direction and generally elongated in the expansion direction. Rollers 19 & 20 drive the material between a pair of members 26 & 27 fitted with outwardly curved receiving ends 28 & 29. Members 26 & 27 are mounted on slides 30 & 31 adjustable in position by a knob 32 operating in a manner similar to knob 15.

By adjusting knobs 15 & 32 the operation is controlled so that compression adequate to form permanent creases in the material from which the honeycomb is formed is achieved between members 26 & 27, but not before the honeycomb enters the nip between rollers 19 & 20.

The material emerging from between members 26 & 27 is sliced into sections by a transversely moving pneumatically powered knife apparatus, indicated at 28. The thus severed sections, when unrestrained, are free to expand in directions E (FIG. 2). On expansion, because of the permanent creasing, they adopt the required stable open-cellular state and they are found to give very satisfactory results when used as cores in laminated structures such as doors, panels for building purposes, or furniture components.

Figure 4:
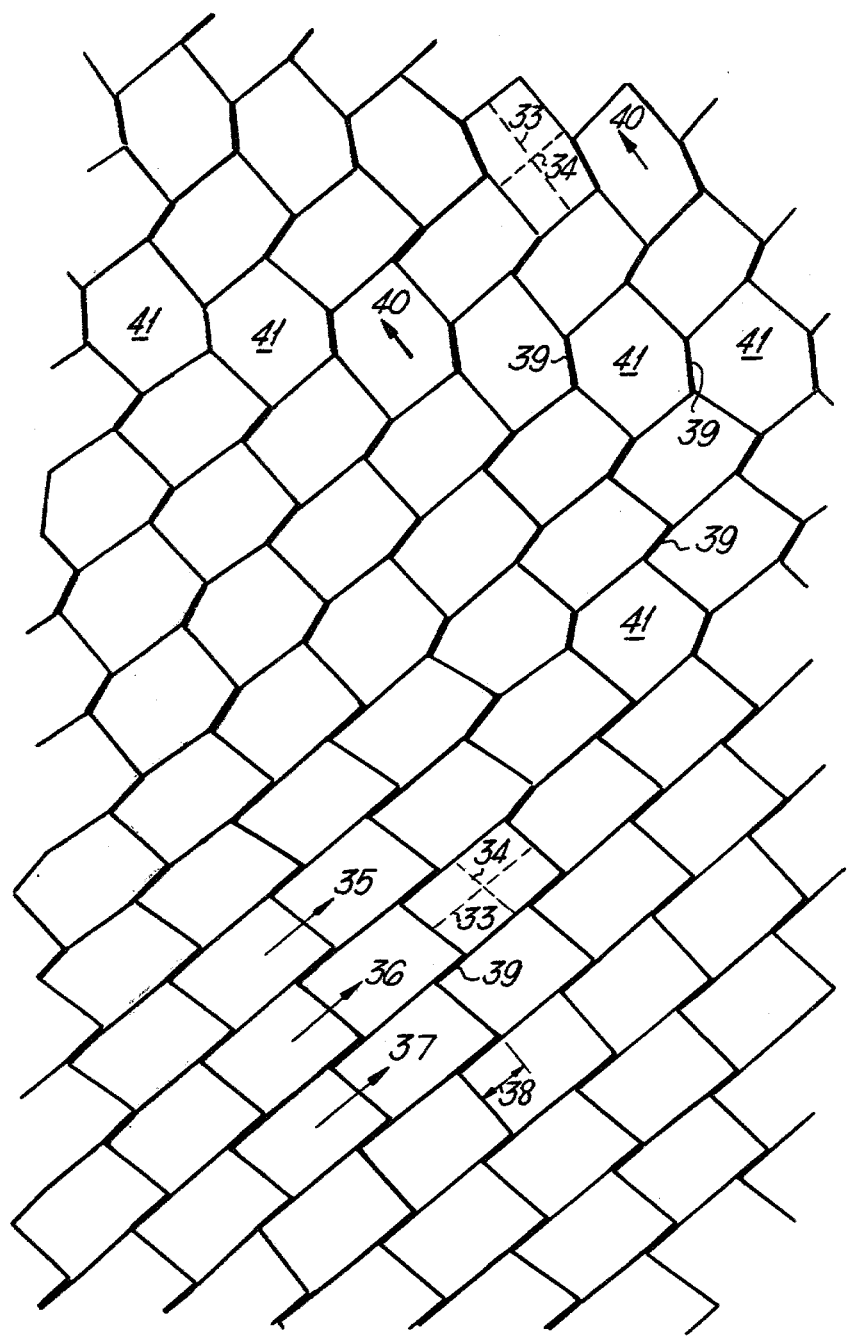
FIG. 4 shows the cellular configuration of a portion of a typical product.

The cellular configuration of a portion of a typical product is shown in FIG. 4. The product has main regions in which the cells are of generally rectangular shape with major axes 33 and minor axes 34, the major axes being aligned to form mutually parallel straight rows of cells, such as the rows indicated by arrows 35, 36 & 37. The cells are progressively displaced in the direction of the rows by a distance 38 which corresponds with the difference in length between the major and minor axis and is substantially equal to the size of the cell walls of double thickness 39 formed by the regularly localised adhesion of layers of the permanently creasable material in the production of the original honeycomb material.

In some of the main regions, the rows run perpendicularly to the rows indicated by the arrows 35, 36 & 37, i.e. in the direction indicated by arrows 40. Between the main regions are transitional regions over which the orientation of some of the rectangular cells changes and the shape of others departs conspicuously from the rectangular, some becoming prominently hexagonal—see for example cells 41. Thus the transition of the row-direction from one main region to another is a gradual one.

FIG. 4 shows a part of a main region and part of a transitional region. The transitional region continues until the next main region is established with the axes of its rectangular cells oriented in direction 40.

The cellular configuration of the product in any particular case depends upon circumstances. In some cases all the cells are obtained in a rectangular form. In other cases there may be an extensive zone or zones of substantially regular hexagonal cells communicating via transitional regions with regions of rectangular cells. Overall, such a product is stable in its re-expanded state.

It will be understood that the foregoing description of a specific apparatus is given for purposes of illustration only. Modifications may be made thereto without departure from the scope of the invention claimed once the principles have been appreciated.

It will also be understood that the invention includes within its scope a laminated structure which comprises a structural honeycomb material which has been expanded or permitted to expand to a stable re-expanded state as herein described and laminated between a pair of facing panels.

I claim:

1. Apparatus for treating a structural honeycomb material of the kind which is extendable in an expansion direction to open it out to a first open cellular state in which it has a generally hexagonal cellular configuration and is bound by outer edges which run in said expansion direction, said apparatus comprising a support for the material in said first open cellular state and permitting movement thereof in the expansion direction, guide means arranged and configured to engage said outer edges of the material as it is moved in said expansion direction and, by reaction with said edges, to compress the material across the expansion direction into an intermediately compressed state, a throat for receiving the material in said intermediately compressed state, said throat being configured for further compressing said material by reaction therewith, to produce permament creases in the creasable material so that the honeycomb material is converted to a condition in which, given freedom to expand, it re-expands across the expansion direction to a second open cellular state and, driving means for engaging the material in said intermediately compressed state across the width thereof taken across the expansion direction and thereby draw the material along the support between said guide means and feed it through said throat for the further compression thereby.

2. Apparatus according to claim 1 in which the throat is downstream of said driving means.

3. Apparatus according to claim 1 in which the driving means is at least one driven roller, the rotary axis of which lies across said expansion direction.

4. Apparatus according to claim 1 in which the driving means is a pair of rollers each of which is faced with a resilient material, and has its rotary axis lying across the expansion direction, said rollers cooperating to form a nip for the engagement of the material.

5. Apparatus according to claim 1 in which the throat is adjustable in its width across the expansion direction.

6. Apparatus according to claim 1 in which the throat is provided in the form of a pair of fences extending generally in the expansion direction.

7. Apparatus according to claim 6 in which the fences are adjustable in their configuration.

8. Apparatus according to claim 1 having a plate for bearing upon the material as it moves through the guide means.

9. Apparatus according to claim 1 having a cutting device arranged to cut the material across the expansion direction after its said further compression.

10. Apparatus according to claim 9 in which the throat and the cutting device are followed, in the expansion direction by a platform for receiving and supporting the material from the throat and permitting it to expand to a stable open cellular state.

11. Apparatus according to claim 1 for use with honeycomb material supplied in continuous, unexpanded form, said apparatus having one or more guide rollers for guiding the material on to the support.

12. A method of treating an unexpanded structural honeycomb material formed of a permanently creasable cellulosic material to convert it to a self-sustaining open cellular state which comprises extending the material in its expansion direction and thereby opening it out to a first open cellular state, further extending the material in said expansion direction while compressing it across said expansion direction to an intermediately compressed state, thereafter engaging the material by driving means extending in driving relationship with the material across the expansion direction thereof to drive said material in the expansion direction and compressing the material across the expansion direction to a compressed closed state in which the cellulosic material is creased, and from which the honeycomb material is expandable, on release, to a second open cellular state, said compression to said compressed closed state being effected by passage of the material through a throat by said driving means.

13. A method of treating a structural honeycomb material formed of permanently creasable material to convert it to a stably re-expandable material which comprises drawing the material along a support whilst compressing it across the expansion direction to an intermediately compressed state by engagement of its edges with guide means arranged to produce said compression, and further compressing the material to produce permanent creases in the permanently creasable material by passing the intermediately compressed material through a throat, the drawing of the material along the support and passage thereof to the throat being effected by driving means engaging the material in said intermediately compressed state across the width thereof taken in the expansion direction.

14. A method according to claim 13 in which said driving means is at least one driven roller, the rotary axis of which lies across the expansion direction.

15. A method according to claim 13 in which the honeycomb material has a cell-size giving 30 or more cells per meter of the width of the material in its unexpanded state.

16. A method according to claim 13 in which the honeycomb material has a width across the expansion direction of at least 500 mm in the original unexpanded state.

* * * * *